(12) United States Patent
Chung et al.

(10) Patent No.: US 12,407,017 B2
(45) Date of Patent: Sep. 2, 2025

(54) LITHIUM SECONDARY BATTERY COMPRISING INORGANIC ELECTROLYTE SOLUTION

(71) Applicants: LG CHEM, LTD., Seoul (KR); IUCF-HYU (INDUSTRY-UNIVERSITY COOPERATION FOUNDATION HANYANG UNIVERSITY), Seoul (KR)

(72) Inventors: Seung-Hyun Chung, Daejeon (KR); Jeong-Gil Kim, Daejeon (KR); Bum-Young Jung, Daejeon (KR); Han-Su Kim, Seoul (KR); A-Young Kim, Seoul (KR); Ju-Hye Song, Seoul (KR); Ho-Jae Jung, Seoul (KR)

(73) Assignees: LG ENERGY SOLUTION, LTD., Seoul (KR); IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 1205 days.

(21) Appl. No.: 17/043,951

(22) PCT Filed: Jul. 12, 2019

(86) PCT No.: PCT/KR2019/008670
§ 371 (c)(1),
(2) Date: Sep. 30, 2020

(87) PCT Pub. No.: WO2020/013667
PCT Pub. Date: Jan. 16, 2020

(65) Prior Publication Data
US 2021/0098826 A1    Apr. 1, 2021

(30) Foreign Application Priority Data
Jul. 12, 2018    (KR) .................. 10-2018-0081308

(51) Int. Cl.
| | |
|---|---|
| *H01M 10/056* | (2010.01) |
| *H01M 4/36* | (2006.01) |
| *H01M 4/48* | (2010.01) |
| *H01M 4/587* | (2010.01) |
| *H01M 10/0525* | (2010.01) |
| *H01M 10/0563* | (2010.01) |
| *H01M 50/409* | (2021.01) |
| *H01M 50/437* | (2021.01) |
| *H01M 50/44* | (2021.01) |
| *H01M 4/02* | (2006.01) |

(52) U.S. Cl.
CPC ....... *H01M 10/0563* (2013.01); *H01M 4/366* (2013.01); *H01M 4/48* (2013.01); *H01M 4/587* (2013.01); *H01M 10/0525* (2013.01); *H01M 50/409* (2021.01); *H01M 50/437* (2021.01); *H01M 50/44* (2021.01); *H01M 2004/027* (2013.01); *H01M 2300/002* (2013.01)

(58) Field of Classification Search
CPC ........ H01M 10/0563; H01M 10/0525; H01M 10/052; H01M 50/437; H01M 50/44; H01M 50/409; H01M 4/366; H01M 4/48; H01M 4/587; H01M 2004/027; H01M 2300/002
See application file for complete search history.

(56) References Cited

U.S. PATENT DOCUMENTS

| | | | |
|---|---|---|---|
| 5,601,951 A | 2/1997 | Johnson et al. | |
| 6,767,669 B2 | 7/2004 | Matsubara et al. | |
| 8,858,655 B2 | 10/2014 | Hambitzer et al. | |
| 9,882,211 B2* | 1/2018 | Kawakami | G04G 21/00 |
| 10,062,899 B2 | 8/2018 | Kang et al. | |
| 10,230,106 B2 | 3/2019 | Hong et al. | |
| 2010/0259224 A1 | 10/2010 | Zinck et al. | |
| 2013/0189583 A1* | 7/2013 | Lee | H01M 4/485 |
| | | | 429/231.1 |

(Continued)

FOREIGN PATENT DOCUMENTS

| | | |
|---|---|---|
| CN | 104662728 A | 5/2015 |
| EP | 0 289 855 A2 | 8/1988 |

(Continued)

OTHER PUBLICATIONS

International Search Report (PCT/ISA/210) issued in PCT/KR2019/008670 mailed on Oct. 25, 2019.
Wang et al., "Interconnected TiOx/carbon hybrid framework incorporated silicon for stable lithium ion battery anodes", Journal of Materials Chemistry A, 2015, pp. 1-28.
European Search Report for Appl. No. 19833192.8 dated Sep. 9, 2021.

*Primary Examiner* — Raymond Alejandro
(74) *Attorney, Agent, or Firm* — Birch, Stewart, Kolasch & Birch, LLP

(57) ABSTRACT

A lithium secondary battery including a positive electrode, a negative electrode, a separator interposed between the positive electrode and the negative electrode, and a sulfur dioxide-based inorganic electrolyte solution. The negative electrode includes a negative electrode active material which includes a carbon material having a coating comprising titanium oxide ($TiO_x$, $0<x<2$). The titanium oxide improves the wettability of the carbon material negative electrode to the inorganic electrolyte solution and the charge transfer reaction on the surface and minimizes the interfacial resistance of the carbon material/inorganic electrolyte solution, thereby improving the high-rate charge/discharge characteristics.

9 Claims, No Drawings

(56) References Cited

U.S. PATENT DOCUMENTS

2016/0079598 A1* 3/2016 Jeong .............. H01M 4/5805
 252/520.5
2016/0240885 A1 8/2016 Nishimura

FOREIGN PATENT DOCUMENTS

| JP | 63-143759 A | 6/1988 |
|---|---|---|
| JP | 2011-507171 A | 3/2011 |
| KR | 10-0412526 B1 | 12/2003 |
| KR | 10-2006-0028327 A | 3/2006 |
| KR | 10-2012-0055735 A | 5/2012 |
| KR | 10-2015-0021456 A | 3/2015 |
| KR | 10-1586194 B1 | 1/2016 |
| KR | 10-2016-0035286 A | 3/2016 |
| KR | 10-2016-0064157 A | 6/2016 |
| KR | 10-1693576 B1 | 1/2017 |
| KR | 10-2017-0023703 A | 3/2017 |
| KR | 10-2017-0090196 A | 8/2017 |
| KR | 10-2018-0035970 A | 4/2018 |
| WO | WO 2018/115016 A1 | 6/2018 |

* cited by examiner

LITHIUM SECONDARY BATTERY COMPRISING INORGANIC ELECTROLYTE SOLUTION

TECHNICAL FIELD

The present disclosure relates to a lithium secondary battery comprising an inorganic electrolyte solution, with improved high-rate characteristics.

The present application claims the benefit of Korean Patent Application No. 10-2018-0081308 filed on Jul. 12, 2018 with the Korean Intellectual Property Office, the disclosure of which is incorporated herein by reference in its entirety.

BACKGROUND ART

With the technology development and increasing demand for mobile devices, the demand for rechargeable secondary batteries with small size and high capacity is dramatically increasing. Among secondary batteries, lithium secondary batteries having high energy density and voltage are commercialized and widely used.

A lithium secondary battery is generally manufactured by placing two electrodes having different potentials with a separator interposed between the two electrodes to prevent an electrical short between them, and injecting an electrolyte for transfer of lithium ions to the two electrodes. Most of lithium secondary batteries use liquid electrolytes containing lithium salts dissolved in organic solvents.

Recently, safety concerns of lithium secondary batteries such as fires and explosions in extreme situations such as high temperature and overcharge drive the need to design batteries free of combustible and flammable organic solvents, and to meet the need, many studies of non-flammable electrolytes, for example, sulfur dioxide-based inorganic electrolyte solutions are being conducted.

The sulfur dioxide-based inorganic electrolyte solutions have ionic conductivity (about 78 to 80 mS/cm) that is about 7 times higher than organic electrolyte solutions and thus they will have an advantage in terms of high-rate characteristics.

However, the sulfur dioxide-based inorganic electrolyte solutions have insufficient wettability on hydrophobic carbon material negative electrodes commonly used in lithium secondary batteries, which reduces the diffusion rate of lithium ions, and intercalation and deintercalation of lithium ions at the carbon material negative electrodes is poor during high-rate charging/discharging, resulting in low charge/discharge efficiency, and accordingly, improvements are needed.

DISCLOSURE

Technical Problem

The present disclosure is designed to solve the above-described problem, and therefore the present disclosure is directed to providing a lithium secondary battery with improved high-rate charge/discharge characteristics using a sulfur dioxide-based inorganic electrolyte solution and a carbon-based negative electrode together.

Technical Solution

According to an aspect of the present disclosure, in a first embodiment, there is provided a lithium secondary battery including a positive electrode, a negative electrode, a separator interposed between the positive electrode and the negative electrode, and a sulfur dioxide-based inorganic electrolyte solution, wherein the negative electrode includes a negative electrode active material, which comprises a carbon material having a coating comprising titanium oxide ($TiO_x$, $0<x<2$).

According to a second embodiment of the present disclosure, in the first embodiment, there is provided the lithium secondary battery wherein the titanium oxide includes TiO, $TiO_{0.5}$, $TiO_{0.68}$, $TiO_{1.3}$, $TiO_{1.5}$, $TiO_{1.7}$, $TiO_{1.9}$ mixtures of any of thereof.

According to a third embodiment of the present disclosure, in the first or second embodiment, there is provided the lithium secondary battery wherein the titanium oxide is present as a coating in an amount of 0.5 weight % to 20 weight %, 0.5 weight % to 10 weight % or 1 to 5 weight % based on an amount of the carbon material.

According to a fourth embodiment of the present disclosure, in any one of the first to third embodiments, there is provided the lithium secondary battery wherein the carbon material includes natural graphite, artificial graphite, amorphous hard carbon, low crystalline soft carbon, carbon black, acetylene black, ketjen black, Super P, graphene, fibrous carbon or mixtures of any of thereof.

According to a fifth embodiment of the present disclosure, in any one of the first to fourth embodiments, there is provided the lithium secondary battery wherein the sulfur dioxide-based inorganic electrolyte solution includes a sulfur dioxide ($SO_2$) and a lithium salt.

According to a sixth embodiment of the present disclosure, in any one of the first to fifth embodiments, there is provided the lithium secondary battery wherein the carbon material having a coating comprising titanium oxide ($TiO_x$, $0<x<2$) is obtained by dispersing a titanium oxide precursor in a solvent to prepare a sol solution, reacting the sol solution and a carbon material to induce a sol-gel reaction, and performing a thermal treatment.

According to a seventh embodiment of the present disclosure, in any one of the first to sixth embodiments, there is provided the lithium secondary battery wherein the titanium oxide precursor is titanium butoxide, titanium isopropoxide, titanium tetrachloride, titanium ethoxide or mixtures of any of thereof.

According to an eighth embodiment of the present disclosure, in any one of the first to seventh embodiments, there is provided the lithium secondary battery wherein the lithium salt includes $LiAlCl_4$, $LiGaCl_4$, $LiBF_4$, $LiBCl_4$, $LiInCl_4$ or mixtures of any of thereof.

According to a ninth embodiment of the present disclosure, in any one of the first to eighth embodiments, there is provided the lithium secondary battery wherein the sulfur dioxide ($SO_2$) is present in an amount of 1 mol to 6 mol based on 1 mol of the lithium salt in the sulfur dioxide-based inorganic electrolyte solution.

According to a tenth embodiment of the present disclosure, in any one of the first to ninth embodiments, there is provided the lithium secondary battery wherein the separator comprises glass fibers.

Advantageous Effects

The lithium secondary battery of the present disclosure including a sulfur dioxide-based inorganic electrolyte solution and a negative electrode including a carbon material coated with titanium oxide has improved high-rate charge/discharge characteristics due to the presence of titanium oxide that contributes to improving the wettability of the carbon material negative electrode to the inorganic electrolyte solution and the charge transfer reaction on the surface and minimizing the interfacial resistance of the carbon material/inorganic electrolyte solution.

BEST MODE

Hereinafter, the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

An embodiment of the present disclosure relates to a lithium secondary battery including a positive electrode, a negative electrode, a separator interposed between the positive electrode and the negative electrode, and a sulfur dioxide-based inorganic electrolyte solution.

The sulfur dioxide-based inorganic electrolyte solution used in the lithium secondary battery of the present disclosure includes a sulfur dioxide and a lithium salt, and the lithium salt may be $LiAlCl_4$, $LiGaCl_4$, $LiBF_4$, $LiBCl_4$, $LiInCl_4$ or mixtures of any of thereof. The lithium salt exists in solid state, and upon injection of $SO_2$ gas, changes to liquid state. In a particular embodiment of the present disclosure, the $SO_2$ gas may be injected through a Teflon hose connected between airtight containers by opening and closing a valve, and the injection may be performed under the pressure of about 1.2 bar. For example, the sulfur dioxide-based inorganic electrolyte solution may be obtained by injecting $SO_2$ gas into $LiAlCl_4$ (or a mixture of $AlCl_3$ and $LiCl$). In a particular embodiment of the present disclosure, the $SO_2$ may be present in an amount of 1 to 6 mol, in particular, 1 to 3 mol based on 1 mol of the lithium salt.

The sulfur dioxide-based inorganic electrolyte solution can avoid fire and explosion risks when the secondary battery is exposed to a high temperature or overcharge environment due to its non-flammability, and thus is safer than flammable organic electrolyte solutions. However, the sulfur dioxide-based inorganic electrolyte solution has insufficient wettability on hydrophobic carbon material negative electrodes commonly used in lithium secondary batteries, which reduces the diffusion rate of lithium ions, and intercalation and deintercalation of lithium ions at the carbon material negative electrode is poor during high-rate charging/discharging, resulting in low charge/discharge efficiency.

Accordingly, the lithium secondary battery of the present disclosure is characterized by including the sulfur dioxide-based inorganic electrolyte solution having a safety advantage, and the negative electrode using the carbon material coated with titanium oxide ($TiO_x$, $0<x<2$) as the negative electrode active material. In detail, the carbon material coated with titanium oxide ($TiO_x$, $0<x<2$) may be obtained by dispersing a titanium oxide precursor in a solvent to prepare a $TiO_x$ sol solution, causing a reaction between the sol solution and a carbon material to induce a sol-gel reaction, removing the solvent by evaporation while stirring the reaction solution in a hot water bath at about 70° C., and performing a thermal treatment of the generated powder at 400 to 500° C. under a nitrogen ($N_2$) atmosphere.

In this instance, the solvent may include ethyl alcohol, water, tetrahydrofuran or mixtures of any of thereof. Additionally, the titanium oxide precursor may include titanium butoxide, titanium isopropoxide, titanium tetrachloride, titanium ethoxide or mixtures of any of thereof.

Through this series of processes, powder having the titanium oxide ($TiO_x$, $0<x<2$) coating on the surface of the carbon material is obtained, and may be used as the negative electrode active material.

The carbon material may include natural graphite, artificial graphite, amorphous hard carbon, low crystalline soft carbon, carbon black, acetylene black, ketjen black, Super P, graphene, fibrous carbon or mixtures of any of thereof.

The titanium oxide ($TiO_x$, $0<x<2$) may be, for example, $TiO$, $TiO_{0.5}$, $TiO_{0.68}$, $TiO_{1.3}$, $TiO_{1.5}$, $TiO_{1.7}$, $TiO_{1.9}$ or mixtures of any of thereof. The titanium oxide ($TiO_x$, $0<x<2$) has good wettability to the electrolyte solution due to its lyophilicity. Additionally, the titanium oxide ($TiO_x$, $0<x<2$) has good electrical conductivity due to having a low band gap energy, compared to titanium dioxide ($TiO_2$) that is an insulator with the band gap energy of 3.2 eV and has low electrical conductivity.

Accordingly, when the titanium oxide is included in the carbon material electrode, the titanium oxide may improve the wettability of the carbon material electrode to the electrolyte solution due to its lyophilicity, and due to its low band gap energy, improve the charge transfer reaction on the electrode surface, thereby improving the diffusion rate of lithium ions and achieving the high-rate charge/discharge of the lithium secondary battery.

The titanium oxide may be in a particle form, and a particle diameter ratio of the titanium oxide and the carbon material may be 1:1000 to 1:6000, in particular 1:2000 to 1:3000. For example, when the carbon material is spherical natural graphite in the form of secondary particles having the average particle diameter of 10 to 50 μm, in particular 15 to 30 μm, the titanium oxide may have the average particle diameter of 1 to 30 nm, in particular, 5 to 15 nm. In this instance, the average particle diameter may be measured by a laser diffraction particle size distribution measurement method.

A coating amount of the titanium oxide may be 0.5 to 20 weight %, in particular 0.5 to 10 weight %, and in particular 1 weight % based on the total amount of the carbon material, and when the said range of the coating amount is satisfied, it is possible to achieve sufficient capacity per weight of the active material, i.e., the carbon material. That is, because the titanium oxide is not an active material and is a coating agent used to provide a wettability effect, it is advantageous that the above-described range is satisfied to express the capacity of the active material.

In an embodiment of the present disclosure, the negative electrode may be manufactured by applying a negative electrode slurry on at least one surface of a current collector, followed by drying and pressing, wherein the negative electrode slurry is prepared by mixing a titanium oxide-coated carbon material as described above as the negative electrode active material and a binder in a solvent. In this instance, the drying may be performed at the temperature of 100 to 150° C. for 1 to 24 hr. Additionally, a conductive material may be added when preparing the negative electrode slurry.

In addition to the carbon material, the negative electrode may include, for example, a Si-based material such as Si, SiO, $SiO_2$; a Sn-based material such as Sn, SnO, $SnO_2$; or mixtures of any of thereof, if necessary, as the negative electrode active material. The negative electrode active material including the carbon material may be present in an amount of 80 weight % to 99 weight % based on the total weight of the negative electrode slurry.

The binder is a substance that assists in the bonding between the active material and the conductive material, or among the active material, the conductive material and the current collector, and generally, is present in an amount of 0.1 to 20 weight % based on the total weight of the negative electrode slurry composition. Examples of the binder include polyvinylidene fluoride-co-hexafluoropropylene (PVDF-co-HEP), polyvinylidenefluoride (PVDF), polyacrylonitrile, polymethylmethacrylate, polyvinylalcohol, carboxylmethylcellulose (CMC), starch, hydroxypropyl cellulose, regenerated cellulose, polyvinylpyrrolidone, tetrafluoroethylene, polyethylene, polypropylene, polyacrylate and styrene butadiene rubber (SBR). The carboxylmethylcellulose (CMC) may be used as a thickening agent to adjust the viscosity of the slurry.

The conductive material is not limited to a particular type if it causes no chemical change in the corresponding battery and has conductivity, and examples of the conductive material include carbon black, for example, carbon black, acetylene black, ketjen black, channel black, furnace black, lamp black, thermal black; a conductive fiber, for example, a carbon fiber or a metal fiber; fluorocarbon, metal powder, for example, aluminum or nickel powder; conductive whisker, for example, zinc oxide, potassium titanate; conductive metal oxide, for example, titanium oxide; and a polyphenylene derivative. The conductive material may be present in an amount of 0.1 to 20 weight % based on the total weight of the negative electrode slurry composition.

The solvent may include water or organic solvents, for example, N-methyl-2-pyrrolidone (NMP), and when the negative electrode slurry includes the negative electrode active material, and optionally, the binder and the conductive material, the solvent may be present in a suitable amount for desirable viscosity. For example, the solvent may be present in such an amount that the concentration of solids in the negative electrode slurry is 50 to 95 weight %, and preferably 70 to 90 weight %.

The current collector is not limited to a particular type if it causes no chemical change in the battery and has conductivity, and for example, includes copper, stainless steel, aluminum, nickel, titanium, sintered carbon, copper or stainless steel surface-treated with carbon, nickel, titanium or silver, and aluminum-cadmium alloy. The thickness of the current collector is not particularly limited, but may have the thickness of 3~500 μm as commonly applied.

Additionally, the coating method of the negative electrode slurry is not limited to a particular type, and includes any coating method commonly used in the art. For example, a coating method using a slot die may be used, and besides, a Meyer bar coating method, a Gravure coating method, a dip coating method, a spray coating method, etc. may be used.

In the lithium secondary battery of the present disclosure, the positive electrode may be manufactured by mixing a positive electrode active material, a conductive material, a binder and a solvent to prepare a slurry, applying the slurry to at least one surface of a current collector, drying and pressing.

The positive electrode active material may include active material particles of $LiCoO_2$, $LiNiO_2$, $LiMn_2O_4$, $LiCoPO_4$, $LiFePO_4$, $LiNi_{1-x-y-z}Co_xM1_yM2_zO_2$ (M1 and M2 are independently Al, Ni, Co, Fe, Mn, V, Cr, Ti, W, Ta, Mg, Mo or two or more of them, and x, y and z are independently atomic fractions of elements in the oxide composition, where $0 \leq x<0.5$, $0 \leq y<0.5$, $0 \leq z<0.5$, $0 \leq x+y+z<1$) or two or more of them.

In the instance, the conductive material, the binder, the solvent and the current collector are the same as described in connection with the negative electrode.

In the lithium secondary battery of the present disclosure, the separator is interposed between the positive electrode and the negative electrode, and uses an insulating thin film having high ion permeability and mechanical strength. The pore size of the separator is generally 0.01 to 10 μm, and the thickness is generally 5 to 300 μm.

The separator may include a porous polymer film made of a polyolefin-based polymer such as ethylene homopolymer, propylene homopolymer, ethylene/butene copolymer, ethylene/hexene copolymer and ethylene/methacrylate copolymer, an insulating thin film having high ion permeability and mechanical strength, and a general porous nonwoven fabric, for example, a nonwoven fabric made of glass fibers or polyethyleneterephthalate fibers. Particularly, the glass fiber separator shows good wettability to the sulfur dioxide-based inorganic electrolyte solution, reduces the internal resistance of the battery and has capacity and life retention advantages.

The secondary battery of the present disclosure may be used in battery cells used as a power source of small devices, and preferably, may be also used in unit batteries of medium- and large-sized battery modules including a plurality of battery cells. Preferred examples of the medium- and large-sized devices include electric vehicles, hybrid electric vehicles, plug-in hybrid electric vehicles and energy storage systems.

MODE FOR DISCLOSURE

Although the present disclosure has been hereinabove described with regard to a limited number of embodiments and drawings, the present disclosure is not limited thereto and it is obvious to those having ordinary skill in the technical field pertaining to the present disclosure that many modifications and changes may be made thereto within the technical features and the appended claims and their equivalents.

EXAMPLE 1

10 ml of titanium butoxide and 10 ml of titanium isopropoxide are dispersed in 100 ml of ethyl alcohol and stirred at room temperature for 30 min to prepare a $TiO_x$ ($0<x<2$) sol solution containing a mixture of TiO, $TiO_{0.5}$, $TiO_{0.68}$, $TiO_{1.3}$, $TiO_{1.5}$, $TiO_{1.7}$ and $TiO_{1.9}$. Natural graphite in the form of secondary particles having the average particle diameter of 20 μm is added to the sol solution to induce a sol-gel reaction for 1 to 2 hr. A predetermined amount of reaction solution is stirred in a hot water bath at about 70° C. to evaporate the solvent, and the generated powder is thermally treated at 500° C. under a nitrogen atmosphere. The result is natural graphite powder having surface coatings of black titanium oxide $TiO_x$ ($0<x<2$) having the average particle diameter of 10 nm in an amount of 1% based on the amount of natural graphite.

A negative electrode slurry containing a carbon material coated with titanium oxide ($TiO_x$, $0<x<2$), more particularly, natural graphite coated with black titanium oxide ($TiO_x$, $0<x<2$) obtained as described above, as a negative electrode active material, and styrene budadiene rubber (SBR) and carboxymethyl cellulose (CMC) as binders at a weight ratio of 96:2:2 dispersed in deionized water is coated on one surface of a 11 μm thick copper foil and dried at 130° C. for 1 hr and pressed to manufacture a negative electrode.

For a separator, a glass fiber separator is used, for example, ADVANTEC GC-50 glass fiber separator (weight 48 g/m², thickness 190 μm, nominal pore size 0.5 μm).

An electrode assembly including the negative electrode and a lithium metal foil as a counter electrode with the glass fiber separator interposed between is obtained and received in a battery case. Subsequently, $SO_2$ gas is injected into a mixture of $AlCl_3$ and LiCl in the airtight container under about 1.2 bar, yielding a sulfur dioxide-based inorganic electrolyte $LiAlCl_4\text{-}3SO_2$, and the obtained inorganic electrolyte solution is injected into the battery case, to manufacture a lithium secondary battery (2032 coin cell).

EXAMPLE 2

A lithium secondary battery is manufactured by the same process as example 1, except that natural graphite coated with 5% of black titanium oxide ($TiO_x$, 0<x<2) on the surface is used for the negative electrode active material when manufacturing the negative electrode.

Comparative Example 1

A lithium secondary battery is manufactured by the same process as example 1, except that natural graphite not coated with black titanium oxide ($TiO_x$, 0<x<2) is used for the negative electrode active material when manufacturing the negative electrode.

Experimental Example 1: Charge/Discharge Test

The lithium secondary battery manufactured as described above is charged/discharged. In this instance, charging is performed up to the voltage of 0.005V at the current density of 1 C rate, discharging is performed up to the voltage of 2V at the same current density, and charging/discharging is performed 100 cycles.

Additionally, while charging/discharging is performed, the interfacial resistance of the secondary battery is measured at room temperature in an atmospheric condition. In detail, the interfacial resistance is measured through electrochemical impedance spectroscopy (EIS) that measures impedance by applying small alternating current (AC) signals of different frequencies to a battery cell, and separates the resistance of a secondary battery.

The results are shown in Table 1.

TABLE 1

|  | Example 1 | Example 2 | Comparative example 1 |
|---|---|---|---|
| 1C discharge Capacity (mAh/g) | 369.9 | 354.2 | 189.7 |
| Capacity retention (%)[1] | 84.1 | 80.9 | 125.4 |
| Interfacial resistance | 112 | 118 | 120 |

[1]Capacity retention (%) = (100th discharge capacity/1st discharge capacity)*100

As can be seen from Table 1, the secondary batteries of examples 1 and 2 using the sulfur dioxide-based inorganic electrolyte solution and the natural graphite coated with titanium oxide show 1 C discharge capacity that is about twice higher than comparative example 1 using uncoated natural graphite, and thus have improved high-rate characteristics, and in the interfacial resistance reduction, their results are good. Presumably, these results are attributed to the titanium oxide coatings on the natural graphite that contribute to improving the wettability of the inorganic electrolyte solution and the charge transfer reaction on the electrode surface.

On the other hand, it is thought that an increase in capacity retention of comparative example 1 by up to 125.4% is due to the capacity of natural graphite manifested with the increasing cycle numbers due to the low wettability of the uncoated natural graphite to the inorganic electrolyte solution. Accordingly, it is predicted that the secondary battery of comparative example 1 will have low initial efficiency.

In contrast, the secondary batteries of examples 1 and 2 show stable capacity retention.

What is claimed is:

1. A lithium secondary battery, comprising:
   a positive electrode;
   a negative electrode;
   a separator interposed between the positive electrode and the negative electrode; and
   a sulfur dioxide-based inorganic electrolyte solution,
   wherein the negative electrode comprises a negative electrode active material, which comprises a carbon material having a coating comprising titanium oxide, wherein the titanium oxide comprises a mixture of TiO, $TiO_{0.5}$, $TiO_{0.68}$ and $TiO_{1.3}$,
   wherein the positive electrode comprises active material particles of Li, $LiCoO_2$, $LiNiO_2$, $LiMn_2O_4$, $LiCoPO_4$, $LiFePO_4$, $LiNi_{1-x-y-z}Co_xM1_yM2_zO_2$ (M1 and M2 are independently Al, Ni, Co, Fe, Mn, V, Cr, Ti, W, Ta, Mg, Mo or two or more of them, and x, y and z are independently atomic fractions of elements in the oxide composition, where 0≤x≤0.5, 0≤y<0.5, 0≤z<0.5, 0≤x+y+z<1) or two or more of them,
   wherein the separator comprises glass fibers, and
   wherein the carbon material is obtained by:
     dispersing a titanium oxide precursor in a solvent to prepare a sol solution,
     thereafter reacting the sol solution and a carbon material to induce a sol-gel reaction, and
     performing a thermal treatment.

2. The lithium secondary battery according to claim 1, wherein the titanium oxide further comprises at least one of $TiO_{1.5}$, $TiO_{1.7}$, or $TiO_{1.9}$.

3. The lithium secondary battery according to claim 1, wherein the titanium oxide is present as a coating in an amount of 0.5 weight % to 20 weight % based on an amount of the carbon material.

4. The lithium secondary battery according to claim 3, wherein the titanium oxide is present as a coating in an amount of 0.5 weight % to 10 weight % based on the amount of the carbon material.

5. The lithium secondary battery according to claim 1, wherein the carbon material comprises at least one of natural graphite, artificial graphite, amorphous hard carbon, low crystalline soft carbon, carbon black, acetylene black, ketjen black, Super P, graphene, or fibrous carbon.

6. The lithium secondary battery according to claim 1, wherein the titanium oxide precursor is at least one of titanium butoxide, titanium isopropoxide, titanium tetrachloride, or titanium ethoxide.

7. The lithium secondary battery according to claim 1, wherein the sulfur dioxide-based inorganic electrolyte solution comprises a sulfur dioxide and a lithium salt.

8. The lithium secondary battery according to claim 7, wherein the lithium salt comprises at least one of $LiAlCl_4$, $LiGaCl_4$, $LiBF_4$, $LiBCl_4$, or $LiInCl_4$.

9. The lithium secondary battery according to claim 7, wherein the sulfur dioxide is present in an amount of 1 mol to 6 mol based on 1 mol of the lithium salt in the sulfur dioxide-based inorganic electrolyte solution.

* * * * *